United States Patent [19]

Lynn

[11] Patent Number: 5,598,998
[45] Date of Patent: Feb. 4, 1997

[54] ELECTRICAL OUTLET BOX MOUNTING BRACKET

[76] Inventor: David M. Lynn, 401 Craver Rd., Welcome, N.C. 27374

[21] Appl. No.: 561,041

[22] Filed: Nov. 20, 1995

[51] Int. Cl.$^6$ ....................................................... H02G 3/08
[52] U.S. Cl. ........................ 248/300; 220/3.3; 248/27.1; 248/906
[58] Field of Search ..................................... 248/300, 906, 248/27.1; 220/3.2, 3.3, 3.5, 3.9, 3.92; 174/48, 49, 50, 58, 61, 63

[56] References Cited

U.S. PATENT DOCUMENTS

| | | |
|---|---|---|
| 1,814,449 | 7/1931 | Morgenstern . |
| 1,850,616 | 3/1932 | Barnett . |
| 2,252,953 | 8/1941 | Walters ................................ 248/906 X |
| 2,439,091 | 4/1948 | Keating . |
| 4,135,337 | 1/1979 | Medlin ............................... 220/3.3 X |
| 4,561,615 | 12/1985 | Medlin, Jr. ........................... 248/906 X |
| 4,964,525 | 10/1990 | Coffey et al. ............................ 220/3.9 |
| 5,005,792 | 4/1991 | Rinderer .............................. 248/906 X |
| 5,009,383 | 4/1991 | Chapman ................................ 248/343 |
| 5,176,345 | 1/1993 | Medlin ................................ 248/906 X |
| 5,224,673 | 7/1993 | Webb .................................. 248/300 X |
| 5,253,831 | 10/1993 | Theodorides ......................... 248/906 X |
| 5,263,676 | 11/1993 | Medlin, Jr. et al. ..................... 248/300 |
| 5,288,041 | 2/1994 | Webb .................................. 248/300 X |
| 5,354,953 | 10/1994 | Nattel et al. .......................... 220/3.3 X |
| 5,452,873 | 9/1995 | Laughlin ............................. 248/906 X |

FOREIGN PATENT DOCUMENTS 2215528  9/1989  United Kingdom .................... 220/3.2

OTHER PUBLICATIONS

Drawings of Pending Design Application of Applicant filed approximately 13 Nov. 1995.
U.S. TEC Flyer, two pages, (undated).

*Primary Examiner*—Derek J. Berger

[57] ABSTRACT

A bracket is provided for use in conjunction with an electrical outlet box as commonly used in homes, office buildings and the like. The bracket is used to attach low voltage communication lines such as for cable television, telephones or for computer network lines. The bracket has a c-shaped frame and includes a large central opening with opposing tabs which divide the opening into a first section for receiving a 110 volt electrical junction box and a second opening for containing low voltage communication lines. Opposing line supports within the second opening each include a narrow neck section to facilitate bending during installation.

6 Claims, 3 Drawing Sheets

ELECTRICAL OUTLET BOX MOUNTING BRACKET

BACKGROUND OF THE INVENTION

1. Field of the Invention

A bracket is provided for supporting electrical communication lines for telephone connections, computer networking, and cable television which consists of a c-shaped frame which can be placed around a conventional electrical outlet box that has been attached to a vertical wall stud. The bracket allows the electrical connections to be located in an easily accessible site, and is convenient for both the installer and user.

2. Description of the Prior Art and Objectives of the Invention

It has become increasingly popular and necessary in recent years to position electrical wall outlets for homes and other buildings in convenient locations for the user as changes and replacements are frequently made to equipment such as television sets, computers, and telephones. With the increase in communications equipment and the requirements of various types of communication line outlets needed, particular attention must be paid to the aesthetics of such installations, with building codes and regulations preventing high and low voltage lines in a single junction box. Formerly, when only a single electrical outlet was placed on a room wall, little or no attention was directed to the outlet placement. However, in recent years, in addition to the conventional electrical outlets, other types of communication lines must now be installed, usually by others than the primary wiring electrician, such as for cable television, computer networking lines, telephone lines and the like. Thus originally, where only one or two outlets were installed by an electrician, now a room wall in a house may require five or six outlet types to accommodate low voltage systems installed by technicians other than the primary electrician. Hence, the wall can suddenly become cluttered and leaves little wall space in some instances, for convenient and aesthetic furniture and equipment placement.

Attempts have been made in the past to consolidate certain of the outlets such as shown in U.S. Pat. No. 354,953 which demonstrates a cable holding device beside an electrical power outlet box. U.S. Pat. No. 5,009,383 shows a bracket for holding a series of electrical junction boxes. U.S. Pat. No. 4,964,525 provides an electrical box mounting bracket positioned between wall studs for containing different sizes of electrical boxes for various devices.

While such prior art devices are useful in certain instances, a need has remained to simplify and consolidate wiring terminals in homes and other buildings for more complex and numerous electrical line types without disturbing the wiring of the primary electrician.

Thus, with the disadvantages problems encountered with prior art brackets and methods, the present invention was conceived and one of its objectives is to supply an electrical outlet box mounting bracket which simplifies the communication and electrical installers' work in providing outlets for various electrical transmission communication lines while maintaining separation of high and low voltage lines.

It is another objective of the invention herein to provide a mounting bracket which consists of a c-shaped frame for surrounding a conventional stud mounted electrical outlet box which will not modify the primary electrical wiring.

It is also an objective of the invention to provide a mounting bracket which can be easily affixed to a vertical wall stud prior to wallboard or sheet rock installation.

It is another objective of the invention to provide a mounting bracket which will allow a homeowners' wall to maintain an aesthetic appearance by reducing and consolidating the number of outlets and cover plates needed.

Various other objectives and advantages of the present invention will become apparent to those skilled in the art as a more detailed description is set forth below.

SUMMARY OF THE INVENTION

The aforesaid and other advantages are realized by an electrical outlet box mounting bracket which is formed from galvanized steel, suitable plastics or other materials and which has a c-shaped planar frame with a large central opening. The frame can be attached to a vertical wall stud around a standard 110 volt electrical outlet box. The central opening is effectively divided into first and second sections by opposing tabs joined to the frame. During installation, the tabs contact the electrical outlet box to position the c-shaped frame therearound and allow the frame to be properly affixed to the vertical wall stud such as by screws or other fasteners. The frame likewise includes opposing electrical line supports extending into the second opening section to hold telephone lines, computer networking lines or the like. Thus, the second opening section is used to retain low voltage lines as opposed to the first opening section containing an electrical outlet box for 110 volt AC electrical lines. Cover plate flanges are integrally formed with the c-shaped frame to provide edges for the wallboard or sheetrock installers to help in maintaining a proper opening during wall construction.

DESCRIPTION OF THE PREFERRED EMBODIMENT AND OPERATION OF THE INVENTION

Figure 1:
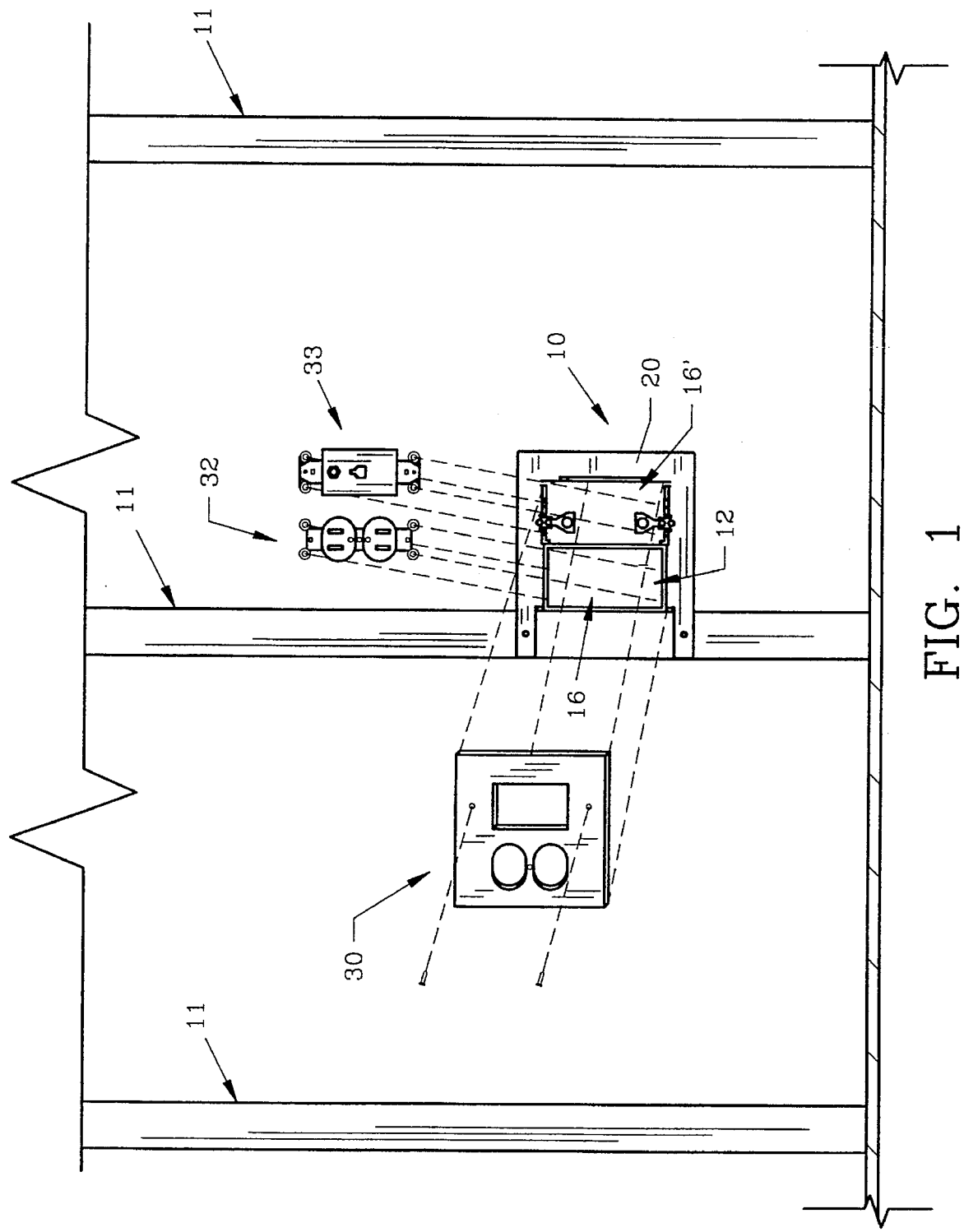
FIG. 1 shows a schematic view of a typical house room wall during building with the mounting bracket of the invention attached to a vertical 2×4 inch stud and with the cover plate, 110 volt outlet terminals and communication terminals exploded therefrom.
Figure 2:
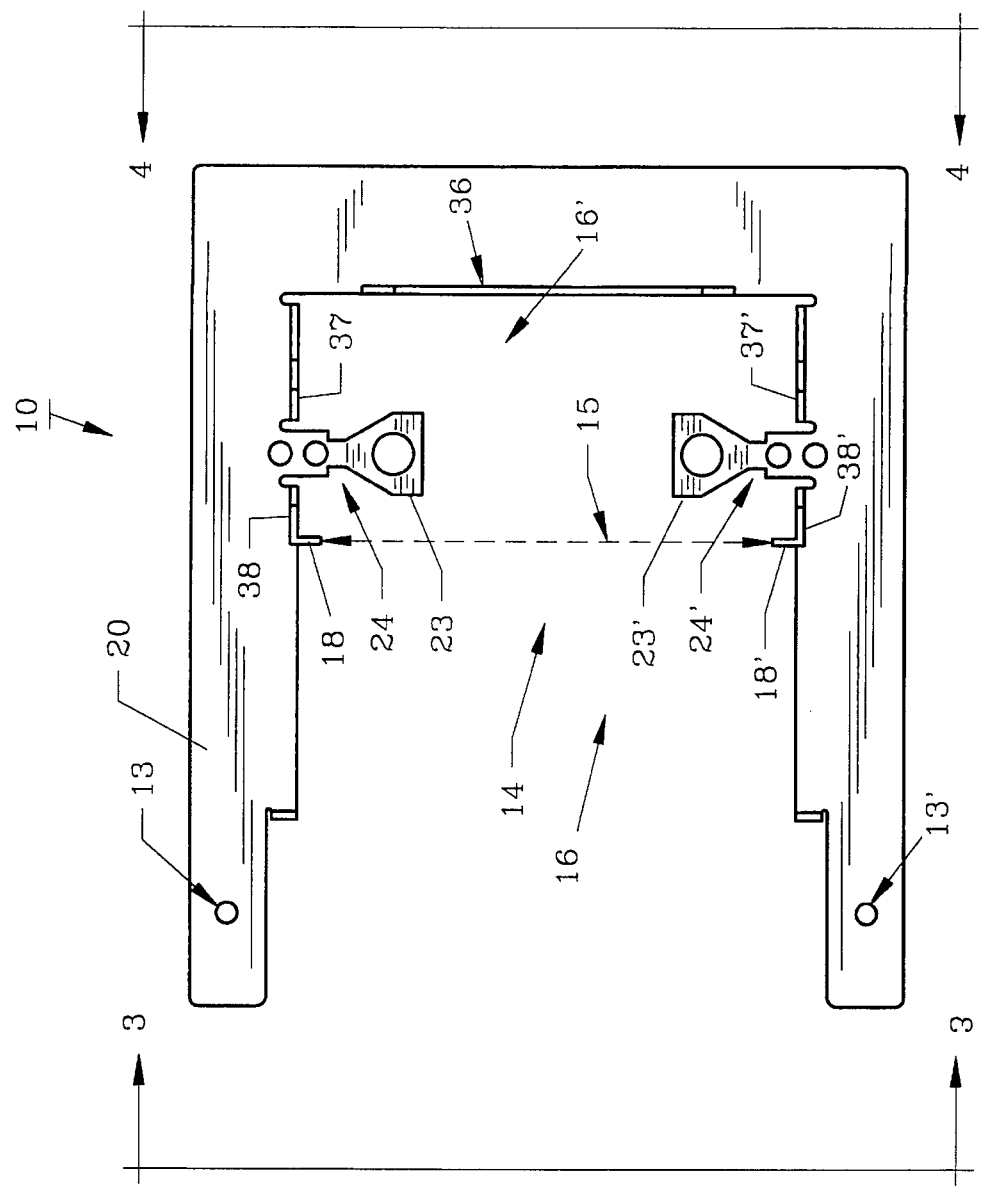
FIG. 2 demonstrates an enlarged front view of the mounting bracket as shown in FIG. 1 removed from the wall and without the electrical components, for clarity.
Figure 3:
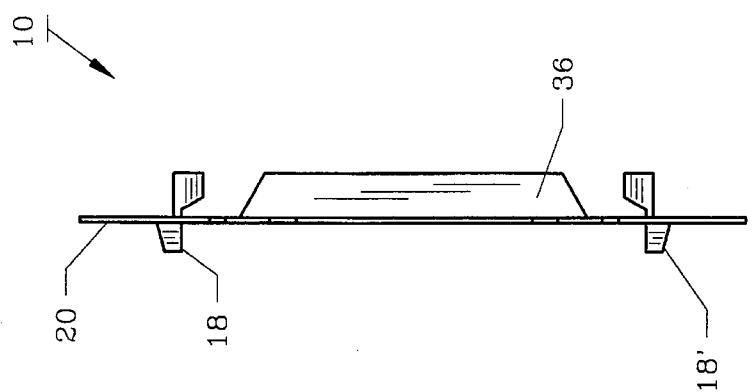
FIG. 3 depicts a side view of the mounting bracket as shown in FIG. 2 along lines 3 —3.
Figure 4:
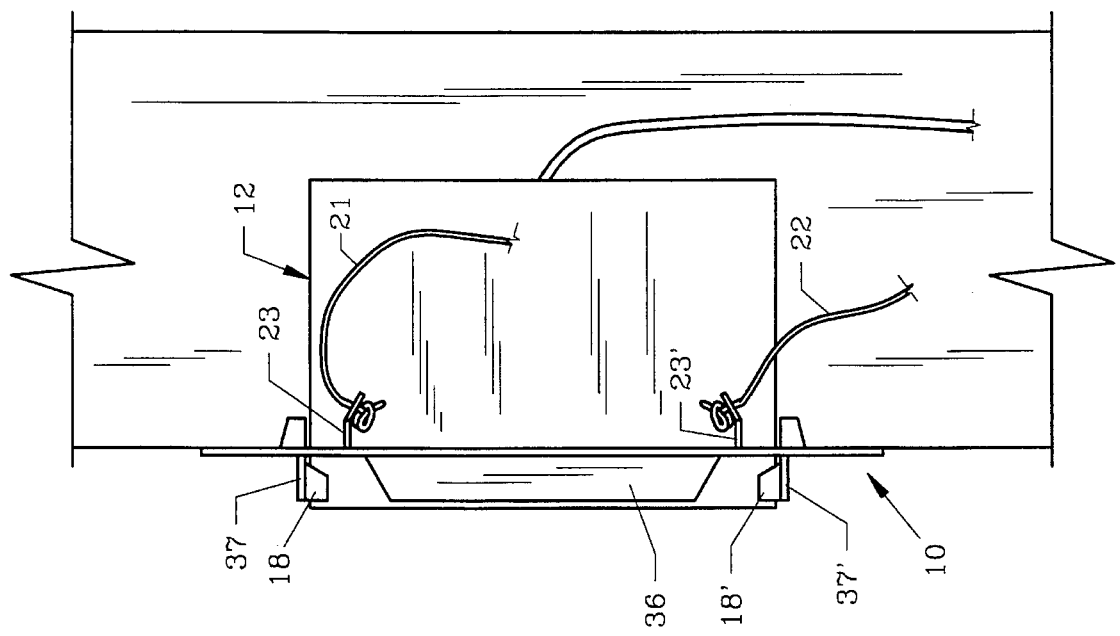
FIG. 4 illustrates a view of the mounting bracket as seen in FIG. 2 along lines 4—4 but with the electrical junction box installed on a wall stud.

For a better understanding of the invention and its use, turning now to the drawings, electrical outlet box mounting bracket 10, the preferred form, is seen in FIG. 1 attached to vertical wall stud 11 of a conventional house under construction, prior to wall board or sheet rock application. Mounting bracket 10 includes planar c-shaped frame 20 which surrounds electrical outlet box 12 and which is attached to wooden 2"×4" stud 11 such as by nails or screws positioned through attaching apertures 13, 13' (FIG. 2). Plastics or other materials as suitable could also be used for frame 20. Mounting bracket 10 is formed from 18 gauge galvanized steel in the preferred form to insure the required rigidity and stability needed. Mounting bracket 10 has a c-shaped frame 20 and includes a large central opening 14 which is effectively divided into two smaller sections 16, 16' by an imaginary line 15 formed by opposing tabs 18, 18'. Tabs 18, 18' are positioned against outlet box 12 during installation as shown in FIG. 4 as c-shaped frame 20 encloses outlet box 12 against wall stud 11 for stability reasons.

As also shown in FIG. 1, c-shaped frame 20 of mounting bracket 10 encloses electrical outlet box 12 within first opening section 16 and second opening section 16' is provided to receive and support low voltage electrical communication lines such as television cable 21, telephone line 22 (FIG. 4), computer network lines (not seen) or otherwise. In FIG. 2, a first electrical communication line support 23 is seen affixed to frame 20 and a second opposing communication line support 23' is featured for maintaining various types of cable, telephone communication and computer network lines. Line supports 23, 23' each have a narrow neck section 24, 24' respectively to allow line supports 23, 23' to be easily, manually bent as shown in FIG. 4. The bending of line supports 23, 23' provides ease and convenience during installation and saves time and effort for the installer in connecting and holding the various communication lines.

In order to support cover plate 30 (FIG. 1) and to insure a sufficient opening through the wallboard, plaster, sheetrock or the like, cover plate flanges 36, 37, 37' 38 and 38' are provided. These cover plate flanges extend perpendicularly outwardly from frame 20 approximately 11 millimeters and are integrally formed with frame 20.

As would be understood by installers of electrical wiring and communication lines, once the wall board has been placed over studs 11 and doping and painting has been completed, a conventional cover plate 30 as seen in FIG. 1 is used to hide mounting bracket 10. 110 volt outlet terminals 32 are connected to outlet box 12 and communication line terminals 33 are attached to frame 20 after the appropriate wires are affixed to communication supports 23, 23'. Thereafter, conventional cover plate 30 is affixed as by screws or the like to electrical outlet box 12 resulting in neat, compact and handy outlets for the home occupants. Mounting bracket 10 therefore provides simplicity and uniformity during electrical wiring of the house and increases the attractiveness of the finished wall.

Various changes and modifications can be made to the preferred form of the invention as shown herein and the illustrations and examples are not intended to limit the scope of the appended clients.

I claim:

1. A bracket for positioning on an electrical outlet box attached to a vertical wall stud for supporting communication lines, said bracket comprising: a c-shaped frame, said c-shaped frame defining a central opening, a pair of opposing tabs, said tabs attached to said c-shaped frame, said tabs effectively dividing said central opening into first and second sections, said c-shaped frame defining an aperture, a first electrical line support, said first line support attached to said c-shaped frame and extending into said second opening section whereby said tabs can contact the electrical outlet box as said c-shaped frame is affixed to the wall stud through said aperture.

2. The bracket of claim 1 and including a second electrical line support, said second electrical line support attached to said c-shaped frame opposing said first electrical line support.

3. The bracket of claim 1 wherein said first electrical line support comprises a neck section, said neck section to facilitate bending.

4. The bracket of claim 1 further comprising a cover plate flange, said cover plate flange attached to said c-shaped frame, said cover plate flange proximate said central opening.

5. The bracket of claim 4 wherein said cover plate flange is integrally formed with said C-shaped frame.

6. The bracket of claim 1 formed from galvanized steel.

\* \* \* \* \*